United States Patent
Coleman et al.

(10) Patent No.: US 10,585,486 B2
(45) Date of Patent: Mar. 10, 2020

(54) GESTURE INTERACTIVE WEARABLE SPATIAL AUDIO SYSTEM

(71) Applicant: HARMAN INTERNATIONAL INDUSTRIES, INCORPORATED, Stamford, CT (US)

(72) Inventors: Tim Coleman, Menlo Park, CA (US); Stefan Marti, Oakland, CA (US); Davide Di Censo, San Mateo, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 199 days.

(21) Appl. No.: 15/107,774

(22) PCT Filed: Dec. 31, 2014

(86) PCT No.: PCT/US2014/073089
§ 371 (c)(1),
(2) Date: Jun. 23, 2016

(87) PCT Pub. No.: WO2015/103439
PCT Pub. Date: Jul. 9, 2015

(65) Prior Publication Data
US 2016/0320847 A1    Nov. 3, 2016

Related U.S. Application Data

(60) Provisional application No. 61/923,560, filed on Jan. 3, 2014, provisional application No. 61/923,571, filed on Jan. 3, 2014.

(51) Int. Cl.
*G06F 3/01* (2006.01)
*B60K 37/06* (2006.01)
(Continued)

(52) U.S. Cl.
CPC .............. *G06F 3/017* (2013.01); *B60K 37/06* (2013.01); *G06F 3/016* (2013.01); *G06F 3/0304* (2013.01);
(Continued)

(58) Field of Classification Search
None
See application file for complete search history.

(56) References Cited

U.S. PATENT DOCUMENTS

| 5,539,741 A | 7/1996 | Barraclough et al. |
| 6,230,130 B1 | 5/2001 | Castello Da Costa et al. |

(Continued)

FOREIGN PATENT DOCUMENTS

| CN | 1218936 A | 6/1999 |
| CN | 201845422 U | 5/2011 |

(Continued)

OTHER PUBLICATIONS

International Search Report and Written Opinion for application No. PCT/US2014/073089 dated Apr. 28, 2015.
(Continued)

*Primary Examiner* — Brian M Butcher
(74) *Attorney, Agent, or Firm* — Artegis Law Group, LLP

(57) ABSTRACT

One embodiment of the present invention sets forth a technique for modifying an audio parameter based on a gesture. The technique includes acquiring sensor data associated with a hand of a user and analyzing the sensor data to determine at least one hand position. The technique further includes detecting a hand gesture based on the at least one hand position and, in response to the hand gesture, modifying a spatial audio parameter associated with an audio stream to generate a modified audio stream. The technique further includes causing the modified audio stream to be reproduced for output to the user.

20 Claims, 7 Drawing Sheets

(51) Int. Cl.
*G06F 3/03* (2006.01)
*H04S 7/00* (2006.01)
*G06F 3/16* (2006.01)
*G06F 3/0484* (2013.01)

(52) U.S. Cl.
CPC .......... *G06F 3/04842* (2013.01); *G06F 3/162* (2013.01); *G06F 3/165* (2013.01); *G06F 3/167* (2013.01); *H04S 7/30* (2013.01); *H04S 7/304* (2013.01); *B60K 2370/146* (2019.05); *H04R 2499/13* (2013.01); *H04S 2400/11* (2013.01); *H04S 2420/01* (2013.01)

(56) References Cited

U.S. PATENT DOCUMENTS

| | | | |
|---|---|---|---|
| 6,647,119 | B1 | 11/2003 | Slezak |
| 8,144,633 | B2 | 3/2012 | Yoakum et al. |
| 8,190,438 | B1 * | 5/2012 | Nelissen ................. G10L 21/00 381/85 |
| 8,922,590 | B1 | 12/2014 | Luckett et al. |
| 9,544,679 | B2 | 1/2017 | Trestain et al. |
| 9,620,131 | B2 | 4/2017 | Patel |
| 2002/0175933 | A1 | 11/2002 | Ronkainen et al. |
| 2004/0111171 | A1 | 6/2004 | Jang et al. |
| 2005/0222844 | A1 | 10/2005 | Kawahara et al. |
| 2005/0259035 | A1 * | 11/2005 | Iwaki ...................... G06F 3/011 345/8 |
| 2005/0264527 | A1 | 12/2005 | Lin |
| 2008/0084981 | A1 | 4/2008 | Lee et al. |
| 2009/0034766 | A1 | 2/2009 | Hamanaka et al. |
| 2009/0097689 | A1 | 4/2009 | Prest et al. |
| 2009/0278915 | A1 | 11/2009 | Kramer et al. |
| 2010/0026780 | A1 | 2/2010 | Tico et al. |
| 2010/0194863 | A1 | 8/2010 | Lopes et al. |
| 2012/0075167 | A1 * | 3/2012 | Lahcanski ............. G06F 3/1454 345/8 |
| 2012/0093348 | A1 | 4/2012 | Li |
| 2012/0210223 | A1 | 8/2012 | Eppolito |
| 2012/0212509 | A1 | 8/2012 | Benko et al. |
| 2012/0230507 | A1 | 9/2012 | Deluca |
| 2012/0242581 | A1 | 9/2012 | Laubach |
| 2012/0266067 | A1 | 10/2012 | Armstrong et al. |
| 2012/0328137 | A1 | 12/2012 | Miyazawa et al. |
| 2013/0141247 | A1 | 6/2013 | Ricci |
| 2013/0154919 | A1 | 6/2013 | Tan et al. |
| 2013/0154930 | A1 | 6/2013 | Xiang et al. |
| 2013/0156201 | A1 | 6/2013 | Nakai |
| 2013/0208926 | A1 | 8/2013 | Vincent et al. |
| 2013/0259238 | A1 | 10/2013 | Xiang et al. |
| 2013/0279706 | A1 | 10/2013 | Marti |
| 2014/0002357 | A1 | 1/2014 | Pombo et al. |
| 2014/0002486 | A1 * | 1/2014 | Ratcliff .................. G09G 3/003 345/629 |
| 2014/0129937 | A1 * | 5/2014 | Jarvinen ............... G06F 3/0487 715/716 |
| 2014/0270305 | A1 | 9/2014 | Baym et al. |
| 2014/0309806 | A1 | 10/2014 | Ricci |
| 2015/0033123 | A1 | 1/2015 | Arrasvuori et al. |
| 2015/0040040 | A1 | 2/2015 | Balan et al. |
| 2015/0309573 | A1 | 10/2015 | Brombach et al. |
| 2016/0004499 | A1 | 1/2016 | Kim et al. |

FOREIGN PATENT DOCUMENTS

| | | |
|---|---|---|
| CN | 102520791 A | 6/2012 |
| CN | 103164995 A | 6/2013 |
| EP | 2720130 A2 | 4/2014 |
| JP | 05-241573 A | 9/1993 |
| JP | 09-090963 A | 4/1997 |
| JP | 2000-040147 A | 2/2000 |
| JP | 2005-269231 A | 9/2005 |
| JP | 2008-118697 A | 5/2008 |
| JP | 2008-123431 A | 5/2008 |
| JP | 2010-258623 A | 11/2010 |
| JP | 2013-207759 A | 10/2013 |
| WO | 2008/132724 A1 | 11/2008 |
| WO | 2008132724 A1 | 11/2008 |
| WO | 2012/120810 A1 | 9/2012 |
| WO | 2012/164153 A1 | 12/2012 |
| WO | 2013/095783 A2 | 6/2013 |

OTHER PUBLICATIONS

Extended European Search Report for Application No. EP 14876011.9 dated Jun. 7, 2017, pp. 13.
Non-final Office Action for U.S. Appl. No. 14/587,602, dated May 1, 2017, 17 pages.
Final Office Action for U.S. Appl. No. 14/587,602, dated Sep. 11, 2017, 15 pages.
Non-final Office Action for U.S. Appl. No. 14/587,602, dated Feb. 7, 2018, 13 pages.
European Search Report for EP 15 150 026.1, dated Apr. 13, 2015.

* cited by examiner

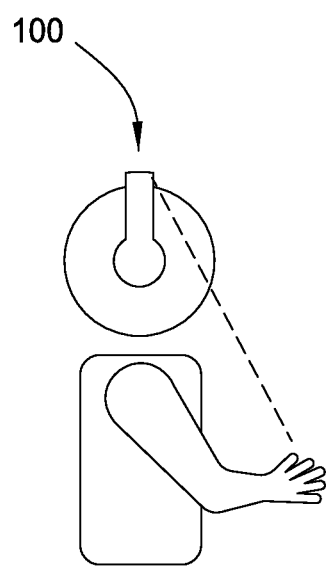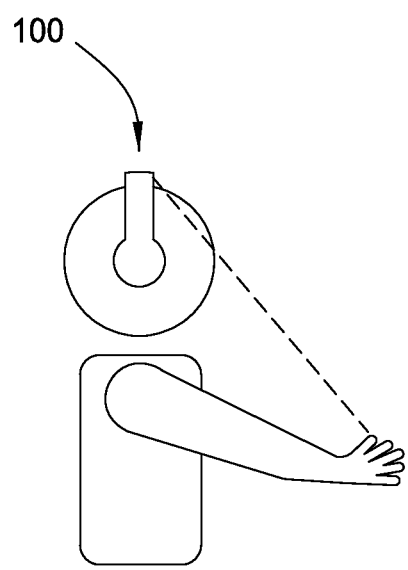
FIG. 3A    FIG. 3B
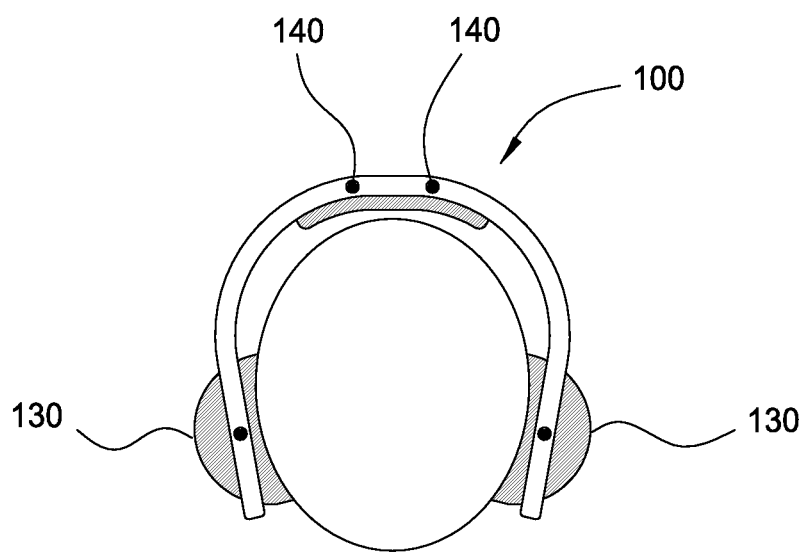
FIG. 3C

GESTURE INTERACTIVE WEARABLE SPATIAL AUDIO SYSTEM

CROSS-REFERENCE TO RELATED APPLICATIONS

This application claims benefit of the U.S. provisional patent application having Ser. No. 61/923,560, filed Jan. 3, 2014 and U.S. provisional patent application having Ser. No. 61/923,571, filed Jan. 3, 2014. The subject matter of these related applications is hereby incorporated herein by reference. The present application is also a national stage application of the international application titled, "GESTURE INTERACTIVE WEARABLE SPATIAL AUDIO SYSTEM," filed on Dec. 31, 2014 and having application number PCT/US2014/73089.

BACKGROUND

Field of the Embodiments of the Invention

Embodiments of the present invention generally relate to audio signal processing and, more specifically, to a gesture interactive wearable spatial audio system.

Description of the Related Art

Use of electronic devices, such as smartphones, portable media players, and personal computers, is becoming increasingly popular in all aspects of daily life. Such devices provide users with convenient access to audio and video content, such as streaming and downloadable music, movies, podcasts, television, and the like. Additionally, such devices provide users with access to a wide range of communication services, many of which provide audio and/or video interfaces that enable users to interact with other users.

A problem oftentimes encountered by users of electronic devices is when an electronic device simultaneously reproduces multiple audio events for the user of that device. For example, a user that is operating multiple software applications on the same device (e.g., multitasking) may have difficulty distinguishing between audio content that is being generated by one software application and audio content that is being generated by another software application. Consequently, in some situations, the user may not know which sounds are associated with which software application and/or the user may be distracted by the simultaneous presentation of multiple audio events, which may inhibit the ability of the user to effectively interact with a particular software application. A common use-case capturing this latter situation is when a user talks to one or more people via a communication service that is being executed on an electronic device while also using the same electronic device to run a separate software application (e.g., a media player). The user may have difficulty paying attention to the conversation if a separate audio event related to the separate software application is generated and played for the user during the conversation.

As the foregoing illustrates, techniques that enable a user to more effectively listen to different audio events would be useful.

SUMMARY

One embodiment of the present invention sets forth a method for modifying an audio parameter based on a gesture. The method includes acquiring sensor data associated with a hand of a user and analyzing the sensor data to determine at least one hand position. The method further includes detecting a hand gesture based on the at least one hand position and, in response to the hand gesture, modifying a spatial audio parameter associated with an audio stream to generate a modified audio stream. The method further includes causing the modified audio stream to be reproduced for output to the user.

Further embodiments provide, among other things, a system and a non-transitory computer-readable medium configured to implement the method set forth above.

Advantageously, the disclosed technique enables a user to modify the position at which an audio event is being reproduced within a sound space. For instance, a user could intuitively grasp a virtual object associated with the audio event and reposition the virtual object at a desired location within a virtual three-dimensional sound space. Accordingly, audio events may be repositioned within the sound space, enabling the user to more effectively listen to and/or interact with multiple audio events at the same time. Additionally, to further assist the user in repositioning an audio event within a virtual three-dimensional sound space, auditory and/or haptic feedback may be provided to the user when the user's hand is proximate to a virtual object associated with the audio event.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3C illustrate a user interacting with the audio system of FIG. 1 by performing a gesture, according to various embodiments;

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
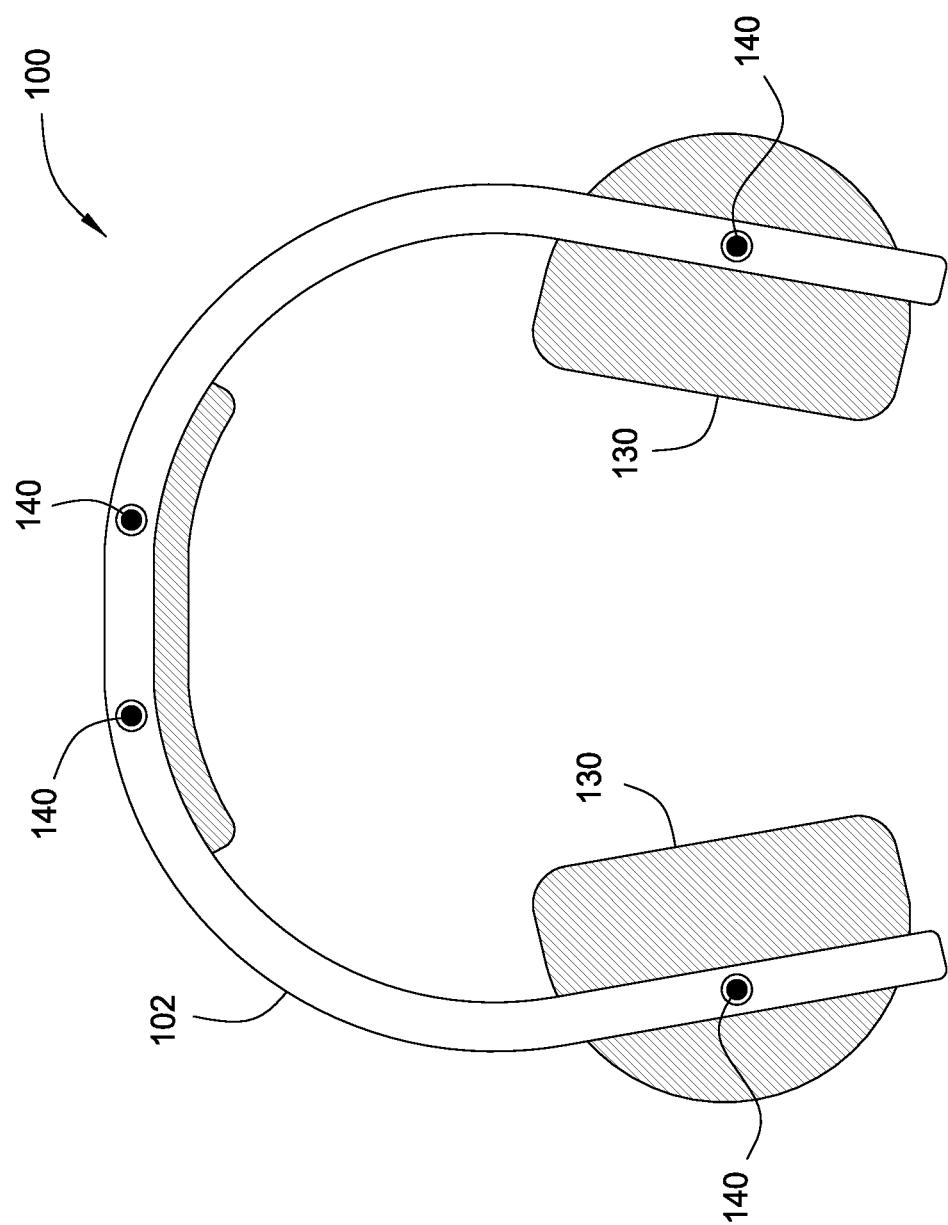
FIG. 1 illustrates an audio system for recognizing user gestures and modifying spatial audio parameters of an audio stream, according to various embodiments.

FIG. 1 illustrates an audio system 100 for recognizing user gestures and modifying spatial audio parameters of an audio stream, according to various embodiments. The audio system 100 may include, without limitation, speakers 130 and one or more sensors 140. The speakers 130 are configured to reproduce one or more audio streams for a user of the audio system 100. The sensor(s) 140 are configured to acquire data associated with gestures performed by the user and/or data that enables the audio system 100 to track the location and/or orientation of the user relative to his or her environment. For example, and without limitation, the sensor(s) 140 may be configured to acquire images of the user's hand(s) and/or arm(s) in order to detect one or more gestures performed by the user. In some embodiments, the sensor(s) 140 include visual sensors, such as cameras. Additionally, in some embodiments, the sensor(s) 140 include ultrasonic sensors, radar sensors, laser sensors, thermal sensors, and/or depth sensors, such as time-of-flight sensors, structured light sensors, and the like.

In various embodiments, the sensor(s) 140 are configured to detect one or more gestures performed by a user's bare hands. For example, and without limitation, data acquired by the sensor(s) 140 may be analyzed to determine the positions of the user's fingertips, joints, hands, wrists, arms, etc. One or more of these positions may then be used to detect a gesture that is being performed by the user. In the same or other embodiments, the sensor(s) 140 are configured to detect one or more gestures performed by the user by tracking the location of an additional device attached to the user. For example, and without limitation, the positions of one or more devices coupled to the user's arm(s) may be tracked to detect a gesture that is being performed by the user. Although four sensors 140 are shown in FIG. 1, any number of sensors 140 located at any position in the audio system 100 may be used to detect user gestures. In some embodiments, at least two sensors 140 are included in the audio system 100 to enable a stereo image to be acquired and, thus, to allow the depth of the user's fingers, hands, arms, etc. to be more accurately determined. In other embodiments, gestures are detected using a single sensor that captures images, acquires depth measurements, calculates positions, and the like. Additionally, in various embodiments, sensor(s) 140 may be positioned on objects other than the device body 102 in which the speakers 130 are disposed, such as on eyeglasses, a watch, a wearable device, the user's body (e.g., the arm-worn Myo™ by Thalmic Labs™), and the like.

The speakers 130 are configured to reproduce an audio stream, such as a multi-channel audio stream, that is outputted by an electronic device integrated with or coupled to the audio system 100. For example, and without limitation, the speakers 130 may include two or more speakers that are capable of rendering audio events (e.g., voices, notifications, music, etc.) included in an audio stream at specific locations within a sound space. In some embodiments, multiple speakers are distributed within the headphones in order to render audio events at specific locations relative to the user's ears. In the same or other embodiments, audio signal processing techniques may be used to virtually render audio events at specific locations within the sound space using two or more speakers.

In various embodiments, the audio system 100 includes a pair of headphones, such as the over-the-ear headphones shown in FIG. 1. In general, however, any type of wired or wireless headphones, including circumaural headphones, supra-aural headphones, and in-ear headphones, may be used to perform the techniques described herein. In other embodiments, the audio system 100 may be any acoustic device that is able to reproduce sound for a user, including an assistive medical device, such as a hearing aid, or a mobile communication device, such as a Bluetooth® headset.

Figure 2:
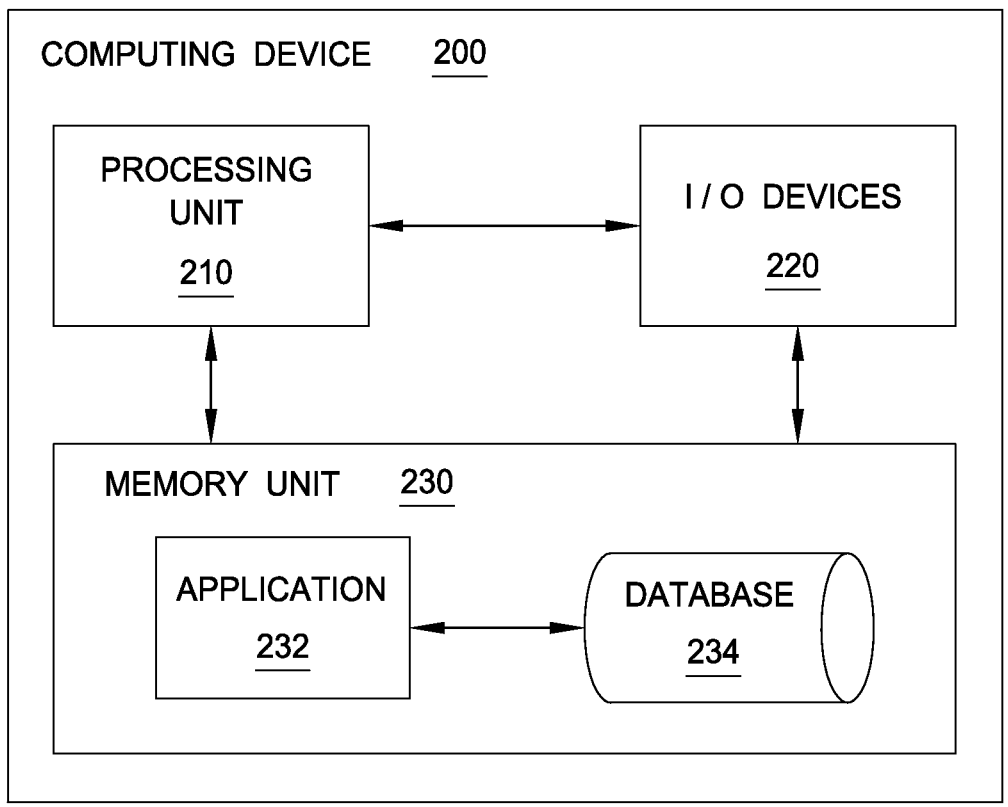
FIG. 2 is a block diagram of a computing device that may be implemented in conjunction with or coupled to the audio system of FIG. 1, according to various embodiments.
Figure 2:
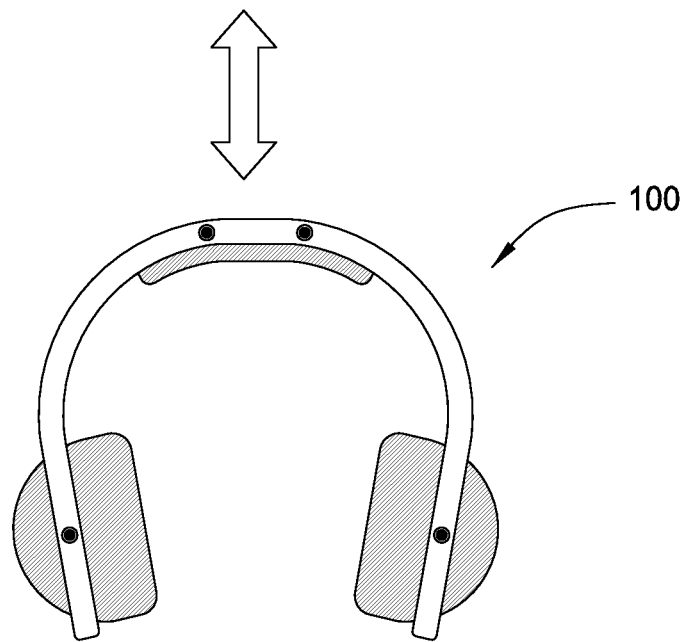

FIG. 2 is a block diagram of a computing device that may be implemented in conjunction with or coupled to the audio system 100 of FIG. 1, according to various embodiments. As shown, computing device 200 includes a processing unit 210, input/output (I/O) devices 220, and a memory device 230. Memory device 230 includes an application 232 configured to interact with a database 234.

Processing unit 210 may include a central processing unit (CPU), digital signal processing unit (DSP), and so forth. In various embodiments, the processing unit 210 is configured to analyze sensor data acquired by the sensor(s) 140 to detect user gestures and/or determine the location and/or orientation of the user relative to the surrounding environment. Additionally, the processing unit 210 may be configured to modify spatial audio parameters associated with an audio stream that is being reproduced by the audio system 100. For example, and without limitation, the processing unit 210 may execute an application 232 that processes one or more audio events included in an audio stream to render the audio events at specific locations in a sound space produced by the speakers 130.

In various embodiments, the processing unit 210 performs analysis on data acquired by the sensor(s) 140 to detect one or more gestures that have been performed by the user. Then, in response to detecting a gesture, the processing unit 210 modifies a spatial audio parameter of an audio stream that is being reproduced by the audio system 100. For example, and without limitation, the processing unit 210 may modify a spatial audio parameter to modify the perceived location(s) of an audio event within the sound space. In some embodiments, the processing unit 210 modifies a spatial audio parameter of an audio stream based on binaural cues (e.g., interaural time difference, interaural intensity difference), spectral cues, dynamic range cues, head-related transfer functions (e.g., spatial filters that describe how sound waves interact with a listener's body), reverberation, and the like. For example, and without limitation, the processing unit 210 may process an audio stream based on one or more parameters associated with the shape of a user's ear, ear canal, and/or head in order to increase the angular resolution at which audio events are reproduced. In the same or other embodiments, the processing unit 210 modifies a spatial audio parameter of an audio stream by modifying which speakers 130 are reproducing an audio event and/or the level(s) at which an audio event is reproduced by one or more of the speakers 130. For example, and without limitation, the processing unit 210 may modify the perceived location(s) of an audio event within the sound space by increasing and/or decreasing the level(s) at which certain speakers 130 are reproducing the audio event. In some embodiments, audio signal processing is performed by the processing unit 210 via middleware, such as OpenAL.

I/O devices 220 may include input devices, output devices, and devices capable of both receiving input and providing output. For example, and without limitation, I/O devices 220 may include wired and/or wireless communication devices that send data to and/or receive data from the sensor(s) 140 included in the audio system 100. Additionally, the I/O devices 220 may include one or more wired or wireless communication devices that receive audio streams (e.g., via a network, such as a local area network and/or the Internet) that are to be reproduced by the speakers 130.

Memory unit 230 may include a memory module or collection of memory modules. Software application 232 within memory unit 230 may be executed by processing unit 210 to implement the overall functionality of the computing device 200, and, thus, to coordinate the operation of the audio system 100 as a whole. The database 234 may store digital signal processing algorithms, audio streams, gesture recognition data, and the like.

Computing device 200 as a whole may be a microprocessor, an application-specific integrated circuit (ASIC), a system-on-a-chip (SoC), a mobile computing device such as a tablet computer or cell phone, a media player, and so forth. Generally, computing device 200 may be configured to coordinate the overall operation of the audio system 100. In other embodiments, the computing device 200 may be coupled to, but separate from the audio system 100. In such embodiments, the audio system 100 may include a separate processor that receives data (e.g., audio streams) from and transmits data (e.g., sensor data) to the computing device 200, which may be included in a consumer electronic device, such as a smartphone, portable media player, personal computer, and the like. However, the embodiments disclosed herein contemplate any technically feasible system configured to implement the functionality of the audio system 100.

FIGS. 3A-3C illustrate a user interacting with the audio system 100 of FIG. 1 by performing a gesture, according to various embodiments. As described above, the audio system 100 detects a gesture performed by the user and, in response, modifies one or more parameters of an audio stream being reproduced by the audio system 100. For example, and without limitation, as shown in FIG. 3A, a user may perform a gesture to modify a spatial audio parameter of an audio event included in an audio stream by moving his or her hand to a perceived position of the audio event in the sound space generated by the audio system 100. Once the user's hand is proximate to the perceived location of the audio event, the user performs a gesture to interact with the audio event. Then, as shown in FIG. 3B, the user may reposition the audio event, such as by moving his or her hand to the left or right and/or up, down, forward, or backward (e.g., within a two-dimensional X, Y plane or within a three-dimensional X, Y, Z space) within the sound space. The hand gesture and the new position of the audio event are then detected via the sensors 140 and passed to the processing unit 210 to modify one or more parameters of the audio stream.

In some embodiments, the user moves his or her hand to a location associated with the perceived position of the audio event (e.g., a point audio source) within the sound space and performs a grasping gesture to grasp a virtual object that corresponds to the audio event. Then, while the user is performing the grasping gesture, the user moves the audio event to the desired location. In response, the processing unit 210 modifies one or more parameters (e.g., spatial audio parameters) associated with the audio stream such that the user perceives the audio event as being rendered from the desired angle and/or distance relative to the user.

Figure 4A:
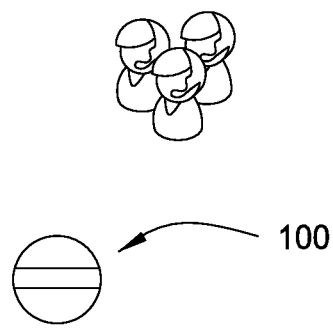
FIGS. 4A-4C illustrate a user interacting with the audio system of FIG. 1 to reposition audio events generated by a communication service, according to various embodiments.
Figure 4B:
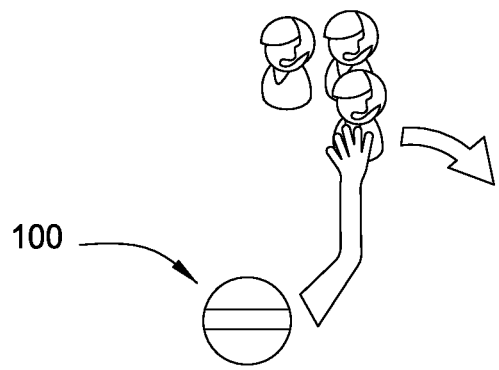
Figure 4C:
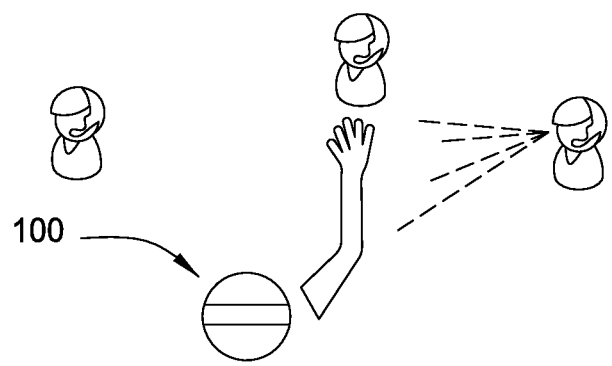

For example, and without limitation, a user may grasp and reposition the voices of one or more people, as shown in FIGS. 4A-4C, which illustrate a user interacting with the audio system 100 of FIG. 1 to reposition audio events generated by a communication service, according to various embodiments. As shown in FIG. 4A, initially, the voices of the people with which the user is speaking may be rendered from similar positions in the sound space. However, the user may move his or her hand to the locations associated with voices and perform a gesture to grasp a virtual object that corresponds to each voice. The user may then move the audio event associated with each voice to a desired location, as shown in FIGS. 4B and 4C. In response, the processing unit 210 modifies one or more parameters associated with each audio event such that the user perceives the voices as being located at the new positions (e.g., as multiple, distinct point audio sources). Accordingly, the audio system 100 may accurately simulate a live conversation, where multiple people are located at different positions relative to the user, enabling the user to more easily distinguish between multiple voices.

Once the user's fingers, hand, arm, etc. is/are proximate to the current location of an audio event (e.g., a virtual object associated with the audio event), the audio system 100 may produce auditory and/or haptic feedback, such as an audio notification, vibration, ultrasound, air pressure, etc., via one or more feedback devices. Producing auditory and/or haptic feedback enables the user to more easily interact with and reposition audio events. In the same or other embodiments, the audio system 100 may provide the user with auditory and/or haptic feedback when a gesture is initiated and/or when a gesture is completed, such as once a user releases a virtual object.

The processing unit 210 may determine whether a user is attempting to reposition an audio event using a variety of techniques. In one technique, the processing unit 210 tracks the location of a first virtual object that is associated with an audio event and determines (e.g., via the sensor(s) 140) when a second virtual object associated with the fingers, hand, and/or arm of the user is interacting (e.g., grasping) with the first virtual object. The processing unit 210 may then use a physics model to determine the new position of the first virtual object based on the interaction with the second virtual object. For example, and without limitation, in some embodiments, the processing unit 210 detects the position of the user's hand to determine when a user has grasped, pushed, pulled, swiped, etc. a virtual object that is associated with an audio event. The processing unit 210 then uses a physics model to determine (e.g., based on a velocity, distance, and/or duration of the grasp, push, pull, and/or swipe) the new position of the audio event. One or more parameters of the audio stream may then be modified such that the user perceives the audio event as being located at the new position.

Figure 5A:
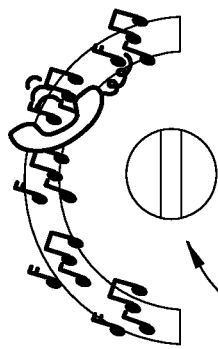
FIGS. 5A-5E illustrate a user interacting with a virtual object to reposition an audio event, according to various embodiments.
Figure 5B:
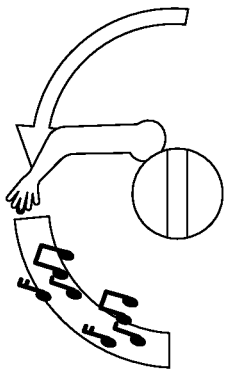
Figure 5C:
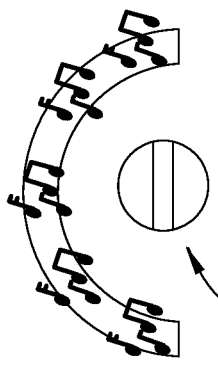
Figure 5D:
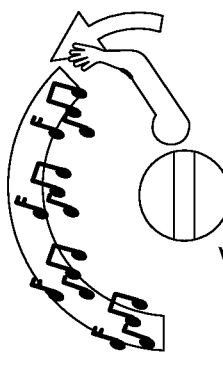
Figure 5E:
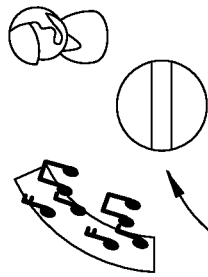

For example, and without limitation, a user may use a swipe gesture to reposition an audio event, as shown in FIGS. 5A-5E, which illustrate a user interacting with a virtual object to reposition an audio event, according to various embodiments. For example, and without limitation, as shown in FIGS. 5A and 5B, while a user is listening to an ambient audio source (e.g., music) being generated by a media player, the user may receive notification of an incoming call from a communication service. The user may then choose to swipe a virtual object associated with the music to the left side of the sound space, as shown in FIGS. 5C and 5D. In response, the processing unit 210 tracks the location of the user's hand and optionally uses a physics model to determine the new position of the virtual object associated with the music based on the velocity, distance, and/or duration of the swipe gesture. In some embodiments, the processing unit 210 uses data received from the sensor(s) 140 to determine where the swipe gesture was initiated and/or where the gesture ended. The processing unit 210 then modifies one or more parameters (e.g., sound balance and/or direction) of the ambient audio source based on the new location of the virtual object so that the user perceives the music as being received from the left side of the sound space. Accordingly, as shown in FIG. 5E, a point audio source, such as an incoming call, may be placed on the right side of the sound space while an ambient audio source, such as music, continues to play from the left side of the sound space. Consequently, the music does not substantially interfere with the incoming call, enabling the user to more effectively listen to and/or interact with multiple audio events at the same time.

In another technique, the position(s) of one or more audio events within a sound space are modified based on a single hand position (e.g., a static gesture), without requiring the user to use his or her arms to grasp, push, pull, swipe, etc. individual audio events. In such embodiments, the orientations of one or more fingers associated with the hand position may indicate to the audio system 100 how the location(s) of one or more audio events within the sound space are to be modified. For example, and without limitation, the user may use a 'V' hand position (e.g., by making the letter V using his or her index finger and middle finger) to cause one or more audio events to move (e.g., split) to the sides of the sound space. In a specific example, when a user is speaking to two people via a communication service, the audio system 100 detects (e.g., based on the 'V' hand position) that a splitting gesture has been detected and, in response, causes a first audio event associated with a first person's voice to move to one side of the sound space and causes a second audio event associated with a second person's voice to move to the other side of the sound space. Additionally, a splitting gesture may be used to move other types of audio events (e.g., music, podcasts, notifications, etc.) to the sides of the sound space. In the same or other embodiments, gestures may be used to evenly distribute audio events within a sound space, to distribute audio events within a sound space according to a predetermined pattern, to make an audio event play from multiple locations, and/or to mute one or more audio events.

In some embodiments, the processing unit 210 uses one or more algorithms to identify individual audio events prior to repositioning the audio events within a sound space. For example, and without limitation, the processing unit 210 may use an algorithm to identify two or more voices received via a communication service. Then, once characteristics associated with each voice (e.g., base pitch, frequency spectrum, cadence, intonation, etc.) have been identified, the spatial audio parameters associated with each voice may be modified to reposition the voices in the sound space. Similar techniques may be used to identify other types of audio events (e.g., music, notifications, etc.) and reposition the audio events within the sound space. Thus, individual audio events may be isolated and repositioned within the sound space even when the audio events have been merged into a single audio channel prior to being received and processed by the processing unit 210.

As described above, in some embodiments, the sensor(s) 140 are configured to track the location and/or orientation of the user within his or her environment. In such embodiments, the location and/or orientation of the user may be used by the audio system 100 to maintain the positions of audio events relative to the user's environment. For example, and without limitation, when the user turns his or her head towards an audio event that is initially located on one side of the sound space, the audio system 100 may track the change in orientation of the user's head relative to the environment and, in response, modify the spatial audio parameters associated with the audio event so that the audio event is repositioned in front of the user. Thus, audio events are reproduced for the user at relatively static angular positions and/or distances relative to the user's environment. In addition, when the user changes his or her location within the surrounding environment, the audio system 100 may modify the loudness of specific audio events based on whether the user is moving towards (e.g., louder) or away from (e.g., quieter) objects within the user's environment.

Figure 6:
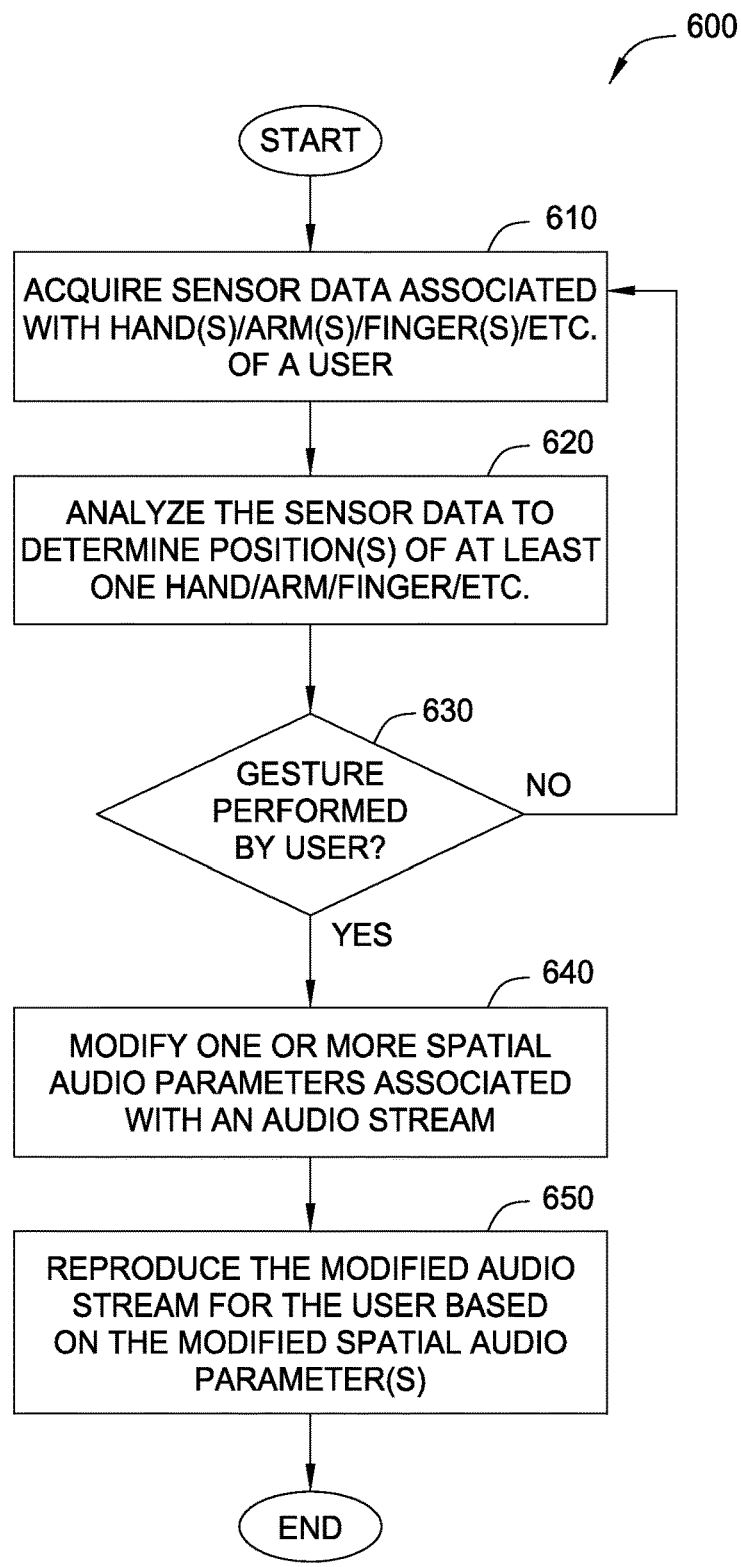
FIG. 6 is a flow diagram of method steps for modifying an audio parameter based on a gesture, according to various embodiments.

FIG. 6 is a flow diagram of method steps for modifying an audio parameter based on a gesture, according to various embodiments. Although the method steps are described in conjunction with the systems of FIGS. 1-5E, persons skilled in the art will understand that any system configured to perform the method steps, in any order, falls within the scope of the present invention.

As shown, a method 600 begins at step 610, where the processing unit 210 acquires sensor data associated with the user (e.g., the user's hands, arms, fingers, etc.) via the sensor(s) 140. At step 620, the processing unit 210 analyzes the sensor data to determine one or more hand positions based on the location(s) and/or orientation(s) of the user's hand(s), finger(s), arm(s), etc. Then, at step 630, the processing unit 210 determines whether a gesture (e.g., a splitting gesture) has been performed based on the one or more hand positions. If a gesture has not been performed by the user, then the method 600 returns to step 610, where the processing unit 210 continues to acquire sensor data.

If a gesture has been performed by the user, then the method 600 proceeds to step 640, where the processing unit 210 modifies one or more parameters associated with an audio stream. For example, and without limitation, if the gesture is a splitting gesture, then the processing unit 210 may modify one or more spatial audio parameters associated with the audio stream to cause one or more audio events to be moved to the sides of the sound space. Next, at step 650, the processing unit 210 causes the modified audio stream to be reproduced for the user via the speakers 130 based on the modified spatial audio parameters. The method 600 then ends.

Figure 7:
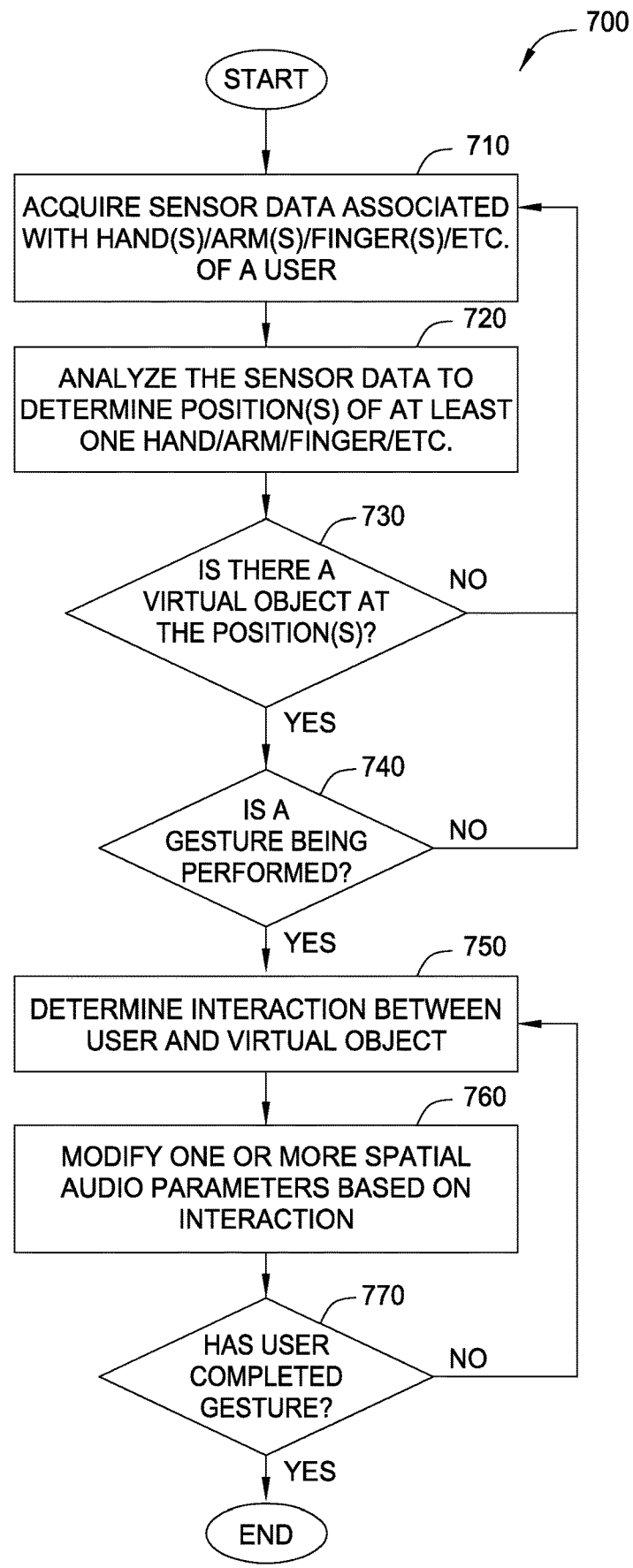
FIG. 7 is a flow diagram of method steps for modifying an audio parameter by repositioning a virtual object, according to various embodiments.

FIG. 7 is a flow diagram of method steps for modifying an audio parameter by repositioning a virtual object, according to various embodiments. Although the method steps are described in conjunction with the systems of FIGS. 1-5E, persons skilled in the art will understand that any system configured to perform the method steps, in any order, falls within the scope of the present invention.

As shown, a method 700 begins at step 710, where the processing unit 210 acquires sensor data associated with the user (e.g., the user's hands, arms, fingers, etc.) via the sensor(s) 140. At step 720, the processing unit 210 analyzes the sensor data to determine one or more hand positions based on the location(s) and/or orientation(s) of the user's hand(s), finger(s), arm(s), etc. At step 730, the processing unit 210 determines whether a virtual object associated with an audio event is located proximate to one or more of the hand positions. If a virtual object is not located proximate to a hand position, then the method 700 returns to step 710, where the processing unit 210 continues to acquire sensor data. If a virtual object is located proximate to a hand position, then the method 700 proceeds to step 740, where the processing unit 210 detect whether the user is performing a gesture (e.g., a grasping gesture) based on the hand position(s).

If a gesture is not being performed by the user, then the method 700 returns to step 710, where the processing unit 210 continues to acquire sensor data. If a gesture is being performed by the user, then the method 700 proceeds to step 750, where the processing unit 210 determines an interaction between the user and the virtual object. For example, and without limitation, the processing unit 210 may continue to acquire sensor data and determine additional hand/arm/finger/etc. positions to determine a position to which the user is moving the virtual object.

Then, at step 760, the processing unit 210 modifies one or more parameters associated with the audio stream based on the interaction between the user and the virtual object. For example, and without limitation, when a user grasps a virtual object associated with an audio event, the processing unit 210 may dynamically modify spatial audio parameters associated with the audio event, such that the user can hear the audio event being moved within the sound space. At step 770, the processing unit 210 determines whether the user has completed the gesture (e.g., by releasing the virtual object). If the user has not completed the gesture, then the method 700 returns to step 750. If the user has completed the gesture, then the processing unit 210 stops modifying the parameters associated with the audio event, and the method 700 ends.

In sum, the processing unit detects a gesture performed by the user via one or more sensors. In response to the gesture, the processing unit modifies one or more parameters associated with an audio stream. The audio system then reproduces the audio stream for the user based on the modified parameters. Additionally, the audio system may determine an interaction between the user and a virtual object associated with one or more audio events via a physics model. One or more parameters associated with an audio stream may then be modified based on the interaction.

At least one advantage of the techniques described herein is that the user is able to modify the position at which an audio event is being reproduced within a sound space. For instance, a user may intuitively grasp a virtual object associated with the audio event and reposition the virtual object at a desired location within a virtual three-dimensional sound space. Accordingly, audio events may be repositioned within the sound space, enabling the user to more effectively listen to and/or interact with multiple audio events at the same time. Additionally, to further assist the user in repositioning an audio event within a virtual three-dimensional sound space, auditory and/or haptic feedback may be provided to the user when the user's hand is proximate to a virtual object associated with the audio event.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of sensors and algorithms that may acquire and process data associated with a user gesture and/or the user's environment, persons skilled in the art will appreciate that the systems and techniques described herein are applicable to other types of sensors and algorithms. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for modifying an audio parameter based on a gesture, the method comprising:
   acquiring, via at least one sensor included in a head-mounted device, sensor data associated with a hand of a user;
   analyzing, via a processor, the sensor data to determine at least one hand position;
   causing haptic feedback to be generated in response to detecting an intersection between the at least one hand position and a virtual object associated with an audio event included in an audio stream;
   detecting a hand gesture based on the at least one hand position;
   in response to the hand gesture, modifying, via a processor, a spatial audio parameter associated with the audio event to generate a modified audio stream by moving a first audio event included in the audio stream towards a first side of a sound space and moving a second audio event included in the audio stream towards a second side of the sound space; and
   causing the modified audio stream to be reproduced for output to the user.

2. The method of claim 1, wherein analyzing the sensor data comprises determining a first hand position at which the hand gesture was initiated, and determining a second hand position at which the hand gesture was completed.

3. The method of claim 2, wherein modifying the spatial audio parameter comprises moving the audio event from a first location in a sound space associated with the first hand position towards a second location in the sound space associated with the second hand position.

4. The method of claim 3, wherein the hand gesture comprises a grasping gesture.

5. The method of claim 3, wherein modifying the spatial audio parameter further comprises determining, via a physics model, an interaction between a first virtual object that corresponds to the audio event and a second virtual object that corresponds to the hand of the user.

6. The method of claim 1, wherein the sensor data comprises at least one of image data and depth data.

7. A system for modifying an audio parameter based on a gesture, comprising:
   a head-mounted device;
   one or more sensors included in the head-mounted device and configured to acquire sensor data associated with a hand of a user;
   a processor coupled to the one or more sensors and configured to:
     analyze the sensor data to determine at least one hand position;
     cause haptic feedback to be generated in response to detecting an intersection between the at least one hand position and a virtual object associated with an audio event included in an audio stream;
     detect a hand gesture based on the at least one hand position; and
     in response to the hand gesture, move a first audio event included in an audio stream from a first location in a sound space towards a second location in the sound space, wherein the second location corresponds to a first side of the sound space, and move a second audio event included in the audio stream towards a second side of the sound space, to generate a modified audio stream; and
   speakers coupled to the processor and configured to reproduce the modified audio stream.

8. The system of claim 7, wherein the hand gesture comprises a splitting gesture.

9. The system of claim 7, wherein the processor is configured to analyze the sensor data to determine a first hand position at which the hand gesture was initiated and a second hand position at which the hand gesture was completed, and wherein the first location in the sound space is associated with the first hand position, and the second location in the sound space is associated with the second hand position.

10. The system of claim 9, wherein the hand gesture comprises at least one of a pushing gesture and a swiping gesture.

11. The system of claim 9, wherein the processor is configured to move the first audio event by determining a distance between the first hand position and the second hand position.

12. The system of claim 7, wherein the one or more sensors comprise a first sensor and a second sensor, and wherein the processor is configured to determine the at least one hand position by determining a first position of the first sensor relative to a second position of the second sensor.

13. The system of claim 7, wherein the processor is configured to move the first audio event from the first location in the sound space towards the second location in the sound space based on a head-related transfer function.

14. The system of claim 7, further comprising a feedback device configured to produce haptic feedback in response to detecting an intersection between the at least one hand position and a virtual object associated with the first audio event.

15. The system of claim 7, wherein the processor is further configured to cause the speakers to produce auditory feedback in response to detecting an intersection between the at least one hand position and a virtual object associated with the first audio event.

16. A non-transitory computer-readable storage medium including instructions that, when executed by a processor, cause the processor to modify an audio parameter based on a gesture, by performing the steps of:
   acquiring, via at least one sensor included in a head-mounted device, sensor data associated with a hand of a user;
   analyzing the sensor data to determine a first hand position and a second hand position;
   detecting a hand gesture based on the first hand position and the second hand position, wherein the hand gesture comprises a splitting gesture;
   in response to the splitting gesture, modifying a spatial audio parameter associated with an audio stream to generate a modified audio stream by moving a first audio event included in the audio stream towards a first side of a sound space and moving a second audio event included in the audio stream towards a second side of the sound space; and
   causing the modified audio stream to be reproduced for output to the user.

17. The method of claim 1, wherein the head-mounted device comprises at least one of a set of headphones and a pair of eyeglasses.

18. The method of claim 1, wherein the at least one sensor comprises a first sensor and a second sensor, and the first sensor and the second sensor are configured to acquire a stereo image of the hand of the user.

19. A method for modifying an audio parameter based on a gesture, the method comprising:
   acquiring, via at least one sensor included in a head-mounted device, sensor data associated with a hand of a user;
   analyzing, via a processor, the sensor data to determine at least one hand position by:
      determining a first hand position at which a hand gesture was initiated, and
      determining a second hand position at which the hand gesture was completed;
   causing haptic feedback to be generated in response to detecting an intersection between the at least one hand position and a virtual object associated with an audio event included in an audio stream;
   detecting the hand gesture based on the at least one hand position;
   in response to the hand gesture, modifying, via a processor, a spatial audio parameter associated with the audio event to generate a modified audio stream by:
      moving the audio event from a first location in a sound space associated with the first hand position towards a second location in the sound space associated with the second hand position, and
      determining, via a physics model, an interaction between a first virtual object that corresponds to the audio event and a second virtual object that corresponds to the hand of the user; and
   causing the modified audio stream to be reproduced for output to the user.

20. A system for modifying an audio parameter based on a gesture, comprising:
   a head-mounted device;
   one or more sensors included in the head-mounted device and configured to acquire sensor data associated with a hand of a user;
   a processor coupled to the one or more sensors and configured to:
      analyze the sensor data to determine at least one hand position;
      cause haptic feedback to be generated in response to detecting an intersection between the at least one hand position and a virtual object associated with an audio event included in an audio stream;
      detect a hand gesture based on the at least one hand position; and
      in response to the hand gesture, move a first audio event included in an audio stream from a first location in a sound space towards a second location in the sound space based on a head-related transfer function to generate a modified audio stream; and
   speakers coupled to the processor and configured to reproduce the modified audio stream.

* * * * *